(12) United States Patent
Radinsky et al.

(10) Patent No.: US 8,869,277 B2
(45) Date of Patent: Oct. 21, 2014

(54) REALTIME MULTIPLE ENGINE SELECTION AND COMBINING

(75) Inventors: Kira Radinsky, Zichron Yaacov (IL); Roy Varshavsky, Tel Aviv (IL); Jack W. Stokes, North Bend, WA (US); Vladimir Holostov, Redmond, WA (US); Edward Schaefer, Lake Ronkonkoma, NY (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 12/894,185

(22) Filed: Sep. 30, 2010

(65) Prior Publication Data

US 2012/0084859 A1    Apr. 5, 2012

(51) Int. Cl.
  *G06F 21/00* (2013.01)
  *G06Q 30/00* (2012.01)
  *G06F 21/56* (2013.01)

(52) U.S. Cl.
  CPC .............. *G06F 21/563* (2013.01); *G06Q 30/00* (2013.01); *G06F 21/56* (2013.01)
  USPC .................................. 726/23; 726/24; 726/25

(58) Field of Classification Search
  CPC .............................. G06F 21/56; G06F 21/563
  USPC ......................................... 726/22, 23; 706/48
  See application file for complete search history.

(56) References Cited

U.S. PATENT DOCUMENTS

| 7,673,341 | B2 | 3/2010 | Kramer et al. | |
|---|---|---|---|---|
| 2006/0253458 | A1* | 11/2006 | Dixon et al. | 707/10 |
| 2008/0071721 | A1* | 3/2008 | Wang et al. | 706/48 |
| 2008/0120720 | A1* | 5/2008 | Guo et al. | 726/23 |
| 2009/0064323 | A1 | 3/2009 | Lin | |

(Continued)

FOREIGN PATENT DOCUMENTS

| CN | 1360267 | A | 7/2002 |
|---|---|---|---|
| CN | 1823334 | A | 8/2006 |
| CN | 101641694 | | 2/2010 |
| CN | 101685456 | A | 3/2010 |

OTHER PUBLICATIONS

Yerima, "Analysis of Bayesian Classification-based approaches for Android malware detection", Jan. 2014, IEEE, p. 25-36.*

(Continued)

*Primary Examiner* — Mahfuzur Rahman
*Assistant Examiner* — Gregory Lane
(74) *Attorney, Agent, or Firm* — Louise Bowman; Sade Fashokun; Micky Minhas

(57) ABSTRACT

Architecture that selects a classification engine based on the expertise of the engine to process a given entity (e.g., a file). Selection of an engine is based on a probability that the engine will detect an unknown entity classification using properties of the entity. One or more of the highest ranked engines are activated in order to achieve the desired performance. A statistical, performance-light module is employed to skip or select several performance-demanding processes. Methods and algorithms are utilized for learning based on matching the best classification engine(s) to detect the entity class based on the entity properties. A user selection option is provided for specifying a maximum number of ranked, classification engines to consider for each state of the machine. A user can also select the minimum probability of detection for a specific entity (e.g., unknown file). The best classifications are re-evaluated over time as the classification engines are updated.

20 Claims, 9 Drawing Sheets

(56) References Cited

U.S. PATENT DOCUMENTS

| | | | |
|---|---|---|---|
| 2009/0099988 A1* | 4/2009 | Stokes et al. | 706/20 |
| 2009/0300730 A1* | 12/2009 | Chaudhry et al. | 726/5 |
| 2009/0300765 A1* | 12/2009 | Moskovitch et al. | 726/24 |
| 2010/0100963 A1 | 4/2010 | Mahaffey | |
| 2010/0154059 A1 | 6/2010 | McNamee et al. | |
| 2012/0005750 A1* | 1/2012 | Satish | 726/23 |

OTHER PUBLICATIONS

Naraine, Ryan, "MS Researchers Tackle Automated Malware Classification", Retrieved at << http://www.eweek.com/c/a/Security/MS-Researchers-Tackle-Automated-Malware-Classification/ >>, May 11, 2006, pp. 3.

Griffin, et al., "Automatic Generation of String Signatures for Malware Detection", Retrieved at << Automatic Generation of String Signatures for Malware Detection >>, Proceedings of the 12th International Symposium on Recent Advances in Intrusion Detection, Sep. 23-25, 2009.

Bose, et al., "Behavioral Detection of Malware on Mobile Handsets", Retrieved at << http://www-personal.umich.edu/~huxin/papers/xin_BehaviorDetection.pdf >>, Proceeding of the 6th international conference on Mobile systems, applications, and services, Jun. 17-20, 2008.

Rieck, et al., "Learning and Classification of Malware Behavior", Retrieved at << http://pi1.informatik.uni-mannheim.de/filepool/publications/malware-classification-dimva08.pdf >>, Proceedings of the 5th international conference on Detection of Intrusions and Malware, and Vulnerability Assessment, Jul. 10-11, 2008.

Zhu, et al., "Using Failure Information Analysis to Detect Enterprise Zombies", Retrieved at << http://cs.northwestern.edu/~ychen/Papers/securecomm09.pdf >>, Lecture Notes of the Institute for Computer Sciences, Social Informatics and Telecommunications Engineering, vol. 19, No. 4, 2009.

Kolbitsch, et al., "Effective and Efficient Malware Detection at the End Host", Retrieved at << http://www.usenix.org/event/sec09/tech/full_papers/sec09_malware.pdf >>, Proceedings of the 18th conference on USENIX security symposium, Aug. 10-14, 2009.

Hamlen, et al., "Exploiting an Antivirus Interface", Retrieved at << http://www.utd.edu/~kxh060100/csi09-hamlen.pdf >>, vol. 31, No. 6, Nov. 2009.

First Office Action, The State Intellectual Property Office of the People's Republic of China, Patent Application No. 201110306969.8, Feb. 11, 2014, 21 pages.

Reply to First Office Action, In The State Intellectual Property Office of the People's Republic of China, Patent Application No. 201110306969.8, Jun. 26, 2014, 40 pages.

\* cited by examiner

REALTIME MULTIPLE ENGINE SELECTION AND COMBINING

BACKGROUND

Classification engines can be utilized in many different classification settings, including, but not limited to, malware, spam, websites, and image classification. In the context of malware, for example, running multiple anti-malware engines, rather than a single engine, can boost precision in the identification of malware. However, applying several engines can decrease the performance of realtime applications as these applications are limited by the amount of available resources. This significantly reduces the value of a straight forward solution. Moreover, selecting the best performing single software engine among a set of classification engines is a common problem in many applications.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability to select one or more candidate classification engines from a set of classification engines based on the expertise of an engine to process a given entity. The architecture learns which one or more classification engines will be applied to a class of entities such as files, text, websites, images, and other classification subjects. For example, each classification engine can have a specific entity (e.g., file) or set of entities (e.g., files) it detects better than another engine. Defining the suitable set of features to determine the entity class enables the building of a learning mechanism so that for a given entity, the best classification engine or set of classification engines can be chosen for the entity with a high probability. If more than one classification engine is selected, the results can be combined for higher efficacy.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
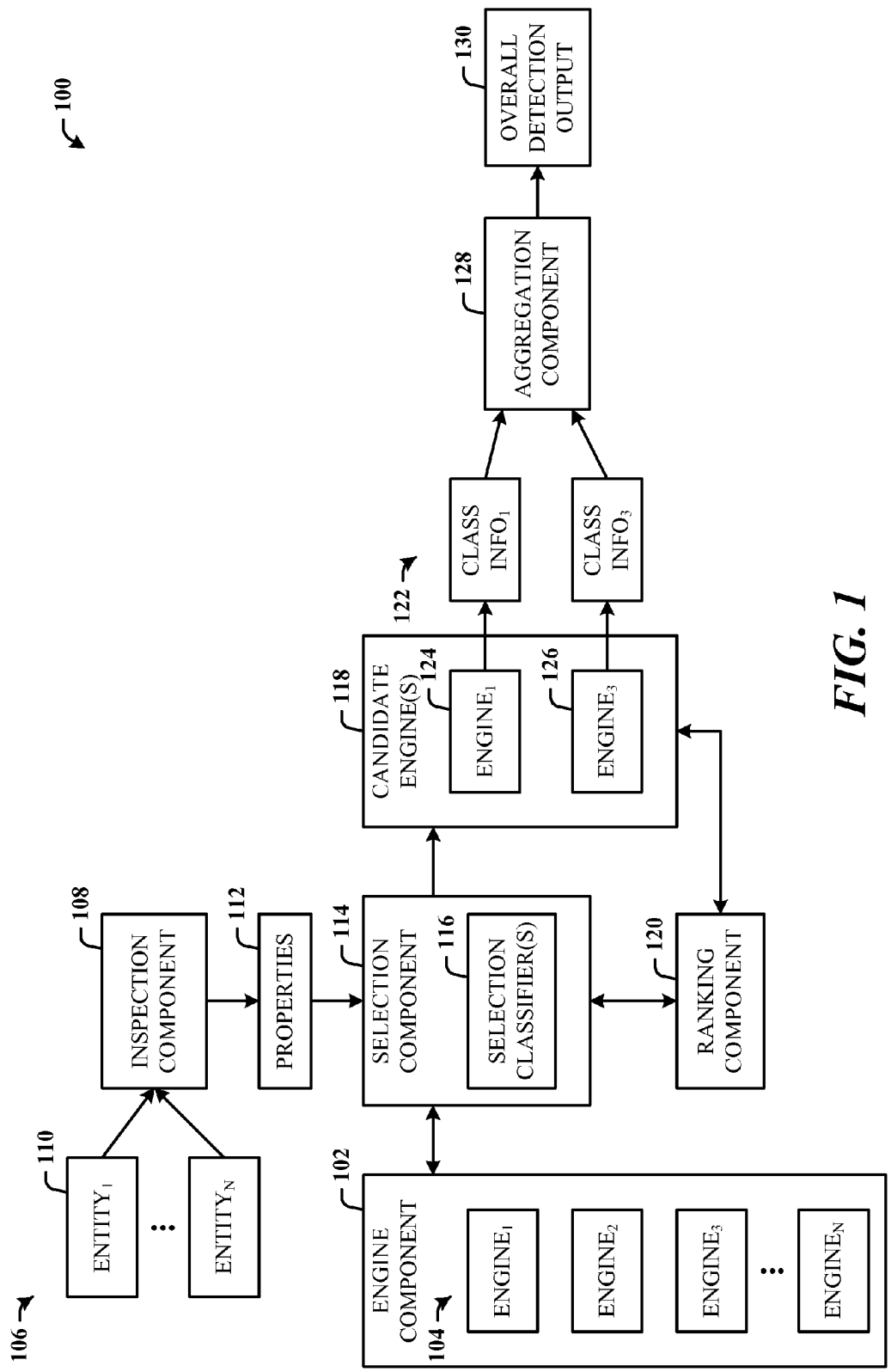
FIG. 1 illustrates a computer-implemented engine selection system in accordance with the disclosed architecture.

The disclosed architecture mitigates the potential detrimental effect of utilizing multiple anti-malware detector engines ("expensive" classifiers) on the performance of realtime applications by providing the capability to select one or more candidate classification engines from a set of classification engines based on the expertise (the likelihood of correctly detecting an entity as malware) of an engine to process a given entity (e.g., a file, text, document, image, website, etc.). A goal is to only use the appropriate "expensive" classification engines (e.g., expensive in terms of resource usage, processing delay, etc.) when needed. Accordingly, "lightweight" (or category) classifiers are employed upfront to assist in selecting only the appropriate expensive classifier(s), which expensive classifier(s) will then be used ultimately to output the overall detection output for a given unknown entity.

When handling file classification, for example, selection of an engine is based on a probability that the engine will detect an unknown entity (e.g., file) class using properties of the entity. The "unknown" entity is an entity that potentially can include malicious software or actions that produce unwanted and unauthorized results. The entity can be unknown in the sense that nothing is known about the entity, or something is marginally known about the entity yet not dispositive. For example, where the entity is a file, the file can be an executable (e.g., an extension of "exe") that does not provide any upfront information about whether it is malicious or not. However, if the unknown file has a PDF (portable document format) extension, the type of file is then readily known, yet what remains unknown is if the PDF file is malicious or not.

Voting and/or ranking can be employed to assist in the selection of the one or more candidate engines. One or more of the highest ranked engines can be activated in order to achieve the desired performance (e.g., in terms of false positives, false negatives, resource consumption, etc.). A statistical, performance-light module is employed to skip or select several performance-demanding processes.

Methods and algorithms are utilized for learning based on matching the best classification engine(s) (e.g., anti-malware engine) to detect the entity class (e.g., malware) based on properties associated with the entity. For example, if the entity is a website, the properties can include IP address, location, reputation, file types, and so on. If the entity is an image, the properties can include, source of the image (e.g., reputable source such as a known trustworthy website, known trustworthy portable computer of a user), size, file type, name, etc.

A user selection option is provided for specifying criteria for selecting the engines, for example, a maximum number of ranked classification engines (e.g., anti-malware engines) and/or maximum processing time to consider for each state of the machine (e.g., if the machine is overloaded, stable etc.). A user can also select the minimum probability of detection for a specific unknown entity (e.g., file). Additionally, the best classifications are re-evaluated over time as the classification engines are updated.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented engine selection system 100 in accordance with the disclosed architecture. The system 100 includes an engine component 102 that includes multiple different (expensive) classification engines 104 for processing of unknown entitites 106, an inspection component 108 that inspects an unknown entity 110 for entity properties 112, and a selection component 114 that employs one or more lightweight classifier(s) 116 to assist in making a selection of one or more candidate expensive classification engines 118 from the different classification engines 104 to process the unknown entity 110. The selection can be based at least in part on the entity properties 112.

The selection component 114 can be associated with a ranking component 120 that performs a ranking function. Ranking can be performed on all the expensive classification engines 104 to assist in selecting the optimum engine(s) for detecting the class of the unknown entity 110. In this case, the selection classifier(s) 116 may not be used. Ranking can also be performed on the candidate expensive classification engines 118. The ranking component 120 can simply output a listing of the ranked expensive classification engines 104 to the selection component 114. A subset (some or all) of the ranked expensive classification engines 104 is then designated the candidate engine(s) 118, and activated to achieve a predetermined performance.

The one or more candidate classification engines 118 can be selected based on a probability that a candidate engine will detect an unknown entity of a specific class (e.g., malicious file, malicious website, malicious image, etc.). In one example, the unknown entity 110 includes (or is) an unknown file and the expensive classification engines 104 are anti-malware engines that are applied to the unknown entity 110 in realtime to determine if the unknown file is malware.

The selection process of the selection component 114 can be based on various factors including, but not limited to, predicted accuracy, predicted false positive and false negative rates, probability of detection and resource consumption, which are described in greater detail hereinbelow.

The one or more selected candidate classification engines 118 output classification information (class info) 122. The classification information 122 can be re-evaluated over time based on updates to the expensive classification engines 104.

Here, the selection component 114 selects two candidate expensive classification engines (from the multiple different engines 104): a first expensive engine 124 and a third expensive engine 126 each of which provides some level of expertise in processing and identifying the unknown entity 110.

Where multiple candidate expensive engines 118 are ultimately selected, an aggregation component 128 can be employed to process the corresponding outputs of classification information 122 and output an overall detection output 130 for the unknown entity 110. Where only a single candidate expensive classification engine is selected, aggregation may not be employed.

Note that there can be several different sets of classifiers employed in the system 100. For example, a bank of classifiers can be employed in (or in association with) the selection component 114, one or more of the engines 104 of the engine component 102 can be classifiers, and an optional classifier as part of the aggregation component 128 that combines the outputs of the candidate engines 118. Moreover, there can be different kinds of classifiers employed in the selection component 114 alone. For example, the selection classifier(s) 116 can include a type classifier employed to identify entity types.

Figure 2:
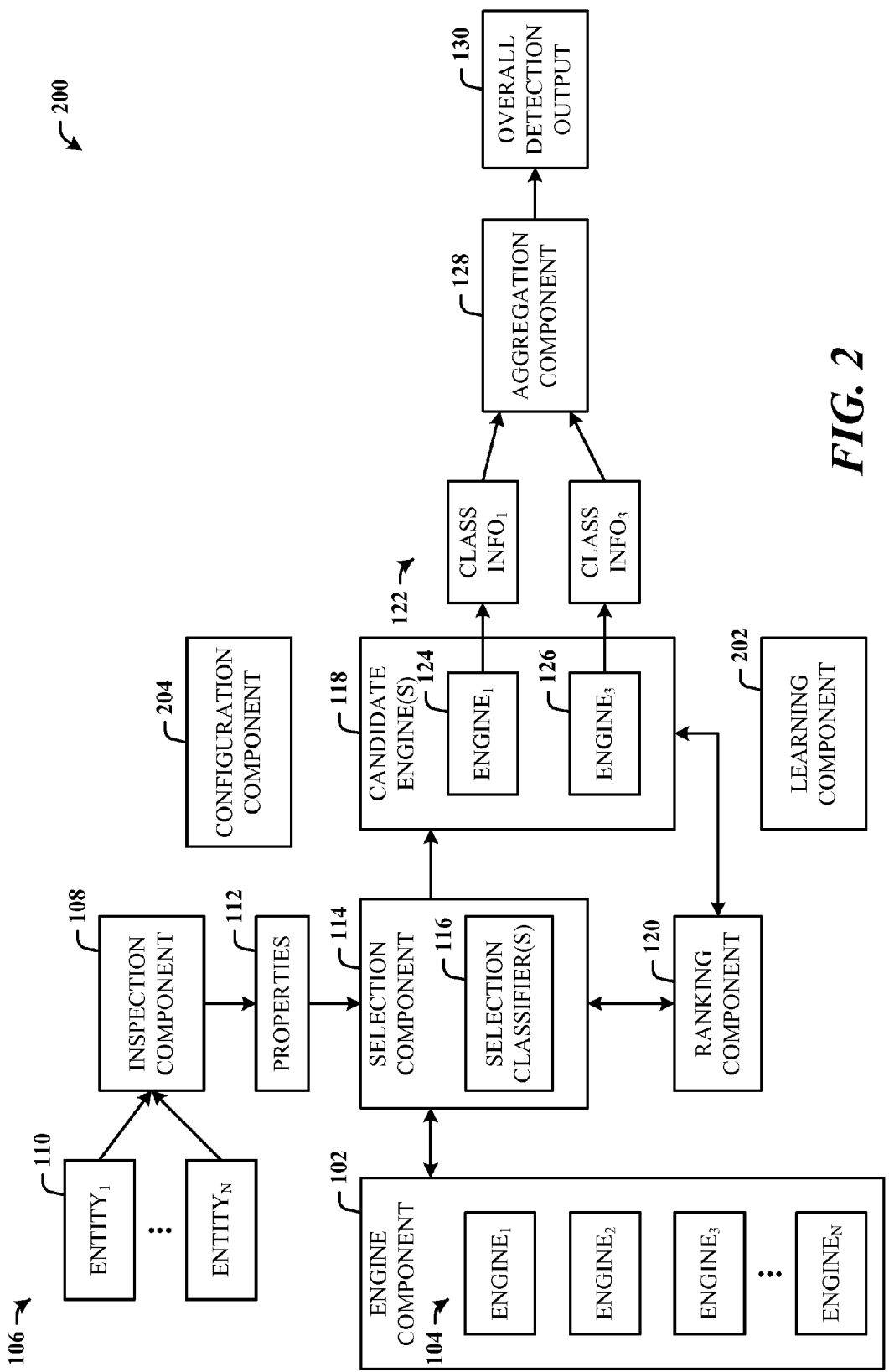
FIG. 2 illustrates an alternative embodiment of an engine selection system that includes a learning component.

FIG. 2 illustrates an alternative embodiment of an engine selection system 200 that includes a learning component 202. The learning component 202 learns which of the different expensive classification engines is applied to a class of the entities. The inputs and outputs of the learning component 202 are not shown, since connections can be to many of the depicted components, component inputs, and component outputs, as desired. For example, learning can be employed for the aggregation component 128 to combine the outputs (the classification information 122) of the candidate engines 118. In another example, the learning for identifying the candidate engines 118 from the candidate engines 118 can occur in (or in cooperation with) the selection component 114.

To train the learning component component 202, the output of all expensive engines 104 is evaluated for each type of entity (e.g., file) under consideration. For example, the learning component 202 can evaluate an unknown PDF file using each of the engines 104. The learning component 202 learns the ranked list (as provided by the ranking component 120) of the candidate engines 118 to evaluate unknown PDF files under one of the proposed criteria (e.g., labels).

A similar technique can also be applied to BOT (a robot program that operates for a user, another program, or simulates a user action) executable files for example. In this case of BOT entities a selection classifier (of the selection classifier(s) 116) in the selection component 114 is provided to evaluate the unknown file and predict that the file is a BOT, since it is unknown in advance the purpose of the unknown file. Off-line, it can be learned that a subset of the expensive engines 104 are good at detecting BOTs, and thus, these expensive engines are selected as the candidate engines 118. This is different than the PDF example, since it is known immediately from the filename extension that the file is a PDF file.

The system 200 can also include a configuration component 204 for specifying a number of ranked candidate engines for each state of a machine and a probability of detection threshold.

Put another way, the engine selection system 200 comprises an engine component that includes multiple different (expensive) anti-malware classification engines for processing of unknown files, an inspection component that receives and inspects an unknown file for file properties, a selection component that makes a selection of one or more candidate anti-malware classification engines from the different anti-malware classification engines to process the unknown file, the selection based at least in part on the file properties input to a given candidate classification engine, and a learning component that learns the candidate anti-malware classification engines based on successful matching of the candidate anti-malware classification engines to the unknown file.

The one or more candidate anti-malware classification engines may process the unknown file in realtime and each candidate classification engine outputs classification information as to a type of the unknown file, the one or more candidate anti-malware classification engines are selected based on a likelihood that each candidate engine will correctly identify a type of malware file. The selection component employs one or more (lightweight) selection classifiers that compute the predicted accuracy of the unknown file for each of the anti-malware classification engines. The one or more candidate anti-malware classification engines process the unknown file in realtime and each associated candidate classification engine outputs classification information as a predicted accuracy as to type of the unknown file, the predicted accuracy of each anti-malware classification engine is based in part on at least one of false positives, false negatives, or errors in a training model used to train a given engine. Two or more candidate anti-malware classification engines are selected based in part on a voting process or a ranking process and associated outputs are combined to output an overall detection output. The input to a candidate anti-malware classification engine includes at least one of a program file, properties of a program file or a source location of the program file.

Figure 3:
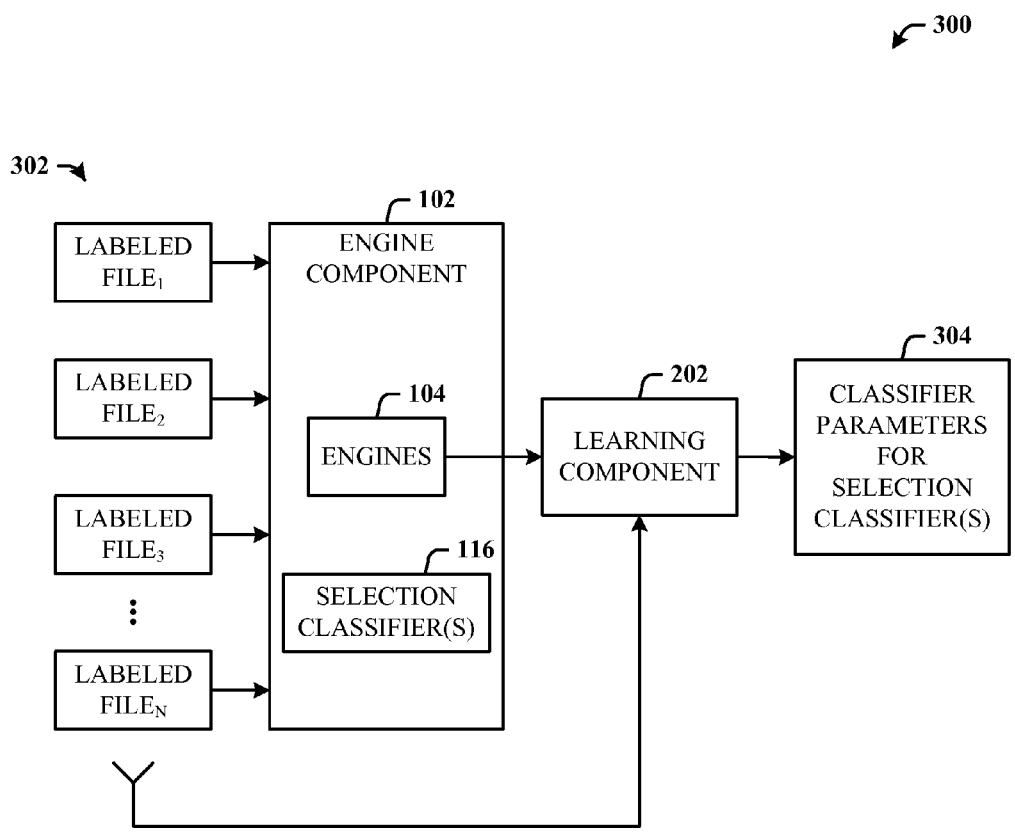
FIG. 3 illustrates a system for training of the learning component.

FIG. 3 illustrates a system 300 for training of the learning component 202. As part of training, in the context of the entities being files, for example, the learning component 202 takes as inputs files 302 of different types (e.g., PDFs, BOTs, etc.) that are labeled appropriately such as benign PDF, malicious PDF, type 3 malicious PDF (for PDFs), and/or benign executable, malicious executable or BOT executable (for unknown executables), etc. This example indicates that training can consider benign versus malicious, or benign versus type N attack (where type N is a specific type of family of attacks), and the outputs of the various engines 104 or other labels when evaluating the known labeled training files. A set of classifier parameters 304 is produced by the learning component 302 which can be used by the selection classifier(s) 116 to evaluate an unknown file and to produce the ranked list of candidate engines 118 to use for each type of file under consideration. This ranked list of candidate engines 118 is then provided to the selection component 114, along with an optional estimate of the resources consumed by those engines to choose the candidate engine(s) 118.

In a more specific implementation of the architecture as applied to unknown files and malware detection, the engine selection system 200 can be applied to unknown files (entities) using (expensive) anti-malware classification engines. In one example, the anti-malware classification engines 104 may be commercial products sold by different companies. In another example, the anti-malware classification engines 104 may be different types of statistical malware classifiers trained using machine learning or other methods (e.g., statistically-based). In a third example, the anti-malware classification engines 104 can include a set of both commercial anti-malware products and statistical classification methods. The unknown files may be executable binaries and/or data files used to generate exploits such as image files (e.g., jpeg), video files (e.g., wmv), music files (e.g., mp3), document files (e.g., word processing and PDF files) or other specific types of data files (e.g., xls).

It is to be appreciated, however, that as described above, the disclosed architecture is not limited to unknown files and malware classification, but can be utilized on "partially known" files that have commonly known file extensions (e.g., PDF), for example. Accordingly, the system 200 includes the engine component 102 that includes the multiple different anti-malware classification engines 104 for realtime processing of unknown files (the unknown entitites 106). The inspection component 108 receives and inspects an unknown file (e.g., the unknown entity 110) for file properties 112. The selection component 114 makes a selection of one or more candidate anti-malware classification engines 118 from the different anti-malware classification engines 104 to process the unknown file. As described herein, the selection can be based on the file properties 112 alone or input to a (lightweight) selection classifier (e.g., performance, category, etc.) for the case of an unknown file and it is desired to predict if the file is a BOT, for example.

As previously indicated, the selection can also be based at least in part on the resources consumed by the candidate classification engines. The learning component 202 learns the candidate anti-malware classification engines 118 based on successful matching of the candidate anti-malware classification engines 118 to the unknown file (e.g., the entity 110). In one example, $ENGINE_2$ and $ENGINE_5$ may be particularly effective at detecting malicious PDF files. If the unknown file is of type PDF, then the selection component 114 will select these two engines as the candidate engines 118 from a pre-computed list that ranks the accuracies of the engines 104 to correctly identify malicious PDF files. In another example, a file type classifier (as one of the selection classifier(s) 116) indicates that an unknown file is malicious based on the properties 112 and the selection component 114 has learned that $ENGINE_6$ and $ENGINE_2$ are particularly effective at identifying malicious files. Then the selection component 114 will select these two engines as the candidate engines 118.

In another example, if the type classifier (as one of the selection classifier(s) 116) predicts that an unknown file is a BOT, for example, and the system had learned that anti-malware $ENGINE_6$, $ENGINE_2$, and $ENGINE_5$ were the top three ranked anti-malware engines in terms of accurately in identifying BOTs, then the selection component 114 will select $ENGINE_6$ and $ENGINE_2$ if the resources did not allow $ENGINE_5$ to also evaluate the unknown file. For instance, the $ENGINE_5$ may have very high accuracy in predicting BOTs by performing a deep and time consuming inspection of the unknown file, but the realtime constraint prevents including this engine in the list of candidate engine(s) 118.

Following is a more detailed description of the various aspects and capabilities of the disclosed engine selection architecture in the context of the task being a file.

The entity classification process can be generalized into three phases: identifying one or more candidate engines (where an engine can be any form of task executer) which are best suited for the task (a "meta-classification" phase) based on several file properties (e.g., file type, file size, header signatures, DLLs used by the code, etc.) and, optionally, the resources consumed by the candidate engines, sending the entity to be inspected to the one or more selected engines, and either selecting the output of the best engine or combining the outputs of the highest ranked engines to produce an overall classification of the unknown task.

In the context of applying the disclosed architecture to malware detection of unknown files, the one or more candidate anti-malware engines can process the unknown file in realtime and lightweight selection classifier(s) predict the accuracies of the anti-malware engines in handling the unknown file. The one or more candidate anti-malware engines are selected based on expertise of each candidate engine to identify a type of malware file, and optionally, other parameters such as resources utilized or consumed by a given engine or in total by the engines, for example. The one or more candidate anti-malware engines process the unknown file in realtime and each candidate engine outputs classification information as to the type of the unknown file. The predicted accuracy of each anti-malware engine is based in part on at least one of false positives, false negatives, or errors in a training model used to train a given engine. Two or more candidate anti-malware engines can be selected based in part on a voting process or a ranking process. The input to a candidate anti-malware engine can include at least one of a program file, the properties of a program file, or a source or source location of the program file.

The learning component 202 facilitates the learning of which one or more anti-malware engines should be applied to a class of files. Each anti-malware engine detects one or more classes of files better than another anti-malware engine. Defining the desired set of properties to determine the file's class (e.g., of malware) enables the building of a learning mechanism so that for a given file, selection of the best anti-malware engine(s) for this file can be made with a high probability of success.

The architecture is based on a system that can run multiple engines (applications), each with its own expertise (unknown or known to the system), in order to make more precise decisions based on the engines outcomes. However, in some cases, running all possible anti-malware engines to evaluate an unknown file requires a prohibitive amount of computer resources and delays the overall determination of the file. The disclosed architecture focuses in part on identifying a single engine or a subset of engines from a set of engines to use in the classification of an unknown file. As previously indicated, the engines can be anti-malware classification engines specifically designated for malware detection.

Alternatively, the selection component 114 can be adaptive. For example, consider that engines one and three are active but still have processing time left over because the processing estimates for the two engines may have been too conservative. The selection component 114 can then select an additional engine to assist in completing the remaining processing.

Two criteria for selecting which anti-malware engines should be selected include the probability of detection and the accuracy of detection. If an anti-malware engine detects that an unknown file is malware, the file is either malware or the anti-malware engine has made a false positive determination. If an anti-malware engine determines that an unknown file is not malware, the unknown file is either benign or the anti-malware engine has made a false negative determination.

In the false positive case, anti-malware engines are typically designed to have very low false positive rates: if the file is detected as being malware, it most likely is malware. In the false negative case, new types or polymorphic forms of malware are oftentimes not correctly detected as malware by many anti-malware engines. If an anti-malware engine does not detect an unknown file as being malware, there is a reasonable probability that the file is malicious but has not been detected correctly. The disclosed architecture can quickly predict (in realtime) if an anti-malware engine can correctly classify an unknown file and the accuracy of the classification.

Specifically, as previously indicated, the one or more anti-malware engines can be selected to evaluate (scan) an unknown file which are likely to correctly detect whether unknown file is malware with high probability, and has high accuracy in the prediction.

Since an individual anti-malware engine may not accurately detect some forms of malware, it may be desired to scan the unknown file with a subset of the anti-malware engines which all are likely to detect the unknown file as being malware with reasonably high rates of accuracy. This combination of multiple anti-malware engines reduces the overall false positive rate.

Therefore, ranking predicted outputs of the anti-malware engines for possible evaluation is disclosed herein. Moreover, if multiple anti-malware engines are used to evaluate an unknown file, the results must be combined based on the predicted accuracy of each anti-malware engine. For example, if one candidate anti-malware engine detects that an unknown file is malicious, but that engine has previously been determined to produce a large percentage of false positives, its contribution should be given a lower weight in the overall combined score. The architecture can also handle the case where the overall accuracy of each engine is observed and the engines (and associated outputs) are weighted accordingly when aggregating the outputs.

In one instance, the architecture assumes that some anti-malware engines are better at detecting malware in particular classes of files than the other anti-malware engines. For example, it is a known fact that different malware engines have different detection rates (as the engines may have different signatures or have different heuristic classification methods for new virus detection). For example, one anti-malware engine vendor may employ analysts who are the best in the world at detecting and writing signatures for trojans, but are not as good as other vendors at detecting viruses. Similarly, another anti-malware engine's internal sensors may allow it to detect rootkits better than any of the other anti-malware engines. In another example, one type of anti-malware engine may be better at detecting PDF file exploits.

Figure 4:
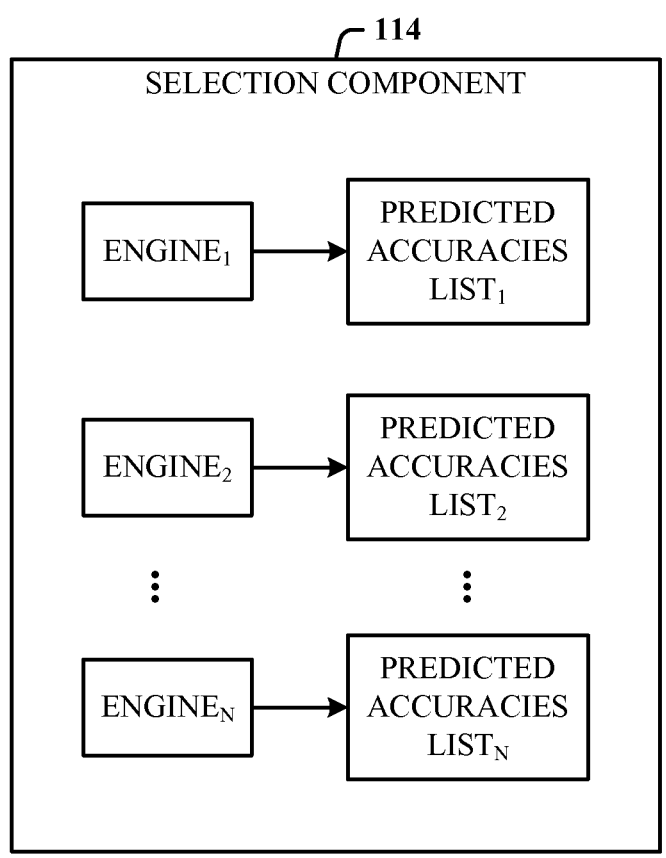
FIG. 4 illustrates a runtime system where the selection component employs the frequency technique.

Consider at least two methods for predicting the accuracy of a particular anti-malware engine—one method is a frequency based method and the other is a machine learning method. FIG. 4 illustrates a runtime system 400 where the selection component 104 employs the frequency technique. In the frequency method, a list of the predicted accuracies is created for each anti-malware engine 104. In system 400, the selection component 104 (in cooperation with the ranking component 120) can select the top N engines from the associated predicted accuracy lists and/or select the top N engines from a list based directly on the properties of the file. For example, consider that the file is a PDF document. There can be a ranked list for PDFs that is different from binary executables, MP3 files, videos, or word processing files.

In the frequency-based accuracy method, the number of false positives and false negatives for a specific anti-malware engine are monitored over a period of time such as the most recent week, most recent month, most recent three months, or most recent year, for example. Multiple time windows (e.g., most recent week and most recent month) can also be considered when predicting the overall accuracy of the anti-malware engine. One method to determine the accuracy of the engine i, $a_i$, is defined as, $$a_i = 1 - \frac{FP_i + FN_i}{N_i}$$

where $N_i$ is the number of total samples scanned by the engine (e.g., anti-malware) and, $FP_i$ and $FN_i$ are the number of false positives and false negatives, respectively, produced by the engine. Furthermore, errors (e.g., false positives and false negatives) which occur more recently can be weighted with higher weights than errors occurring in the more distant past. For example, if a vendor has released a generic signature which detects large numbers of similar types of files as malware, but the generic signature has a high false positive rate and incorrectly detects some clean files as malware, this can be weighted accordingly. While the generic signature is being used by the production anti-malware engines, the false positive rate will be high. Once the error in the generic signature has been detected, the error can quickly be removed and the false positive rate will decrease.

Similarly, the anti-malware engine may not detect new forms of malware in the production signatures leading to a high false negative rate. Once a new set of signatures or generic signatures are released for the new family of malware, the false negative rate will decrease. In other words, the accuracies of the anti-malware engines will vary over time.

One method to handle time-varying accuracies for the frequency-based accuracy is to assign a weight to each false positive or false negative based on the difference between the current time and the time when the false positive or false negative was first detected. False positives and false negatives which occur more recently are given a higher weight than those which occurred earlier in time.

The accuracies of each individual anti-malware engine (based on the file properties defined herein below) are then used to select the best individual or subset from a set of anti-malware engines for in-depth scanning. This frequency-based method for determining the accuracy of an anti-malware engine estimates the overall accuracy of each engine: all types of malwares are considered equivalent. The method does not attempt to assign an accuracy based on the predicted type of the malware. To do so, a machine learning approach is employed (which is considered next).

Figure 5:
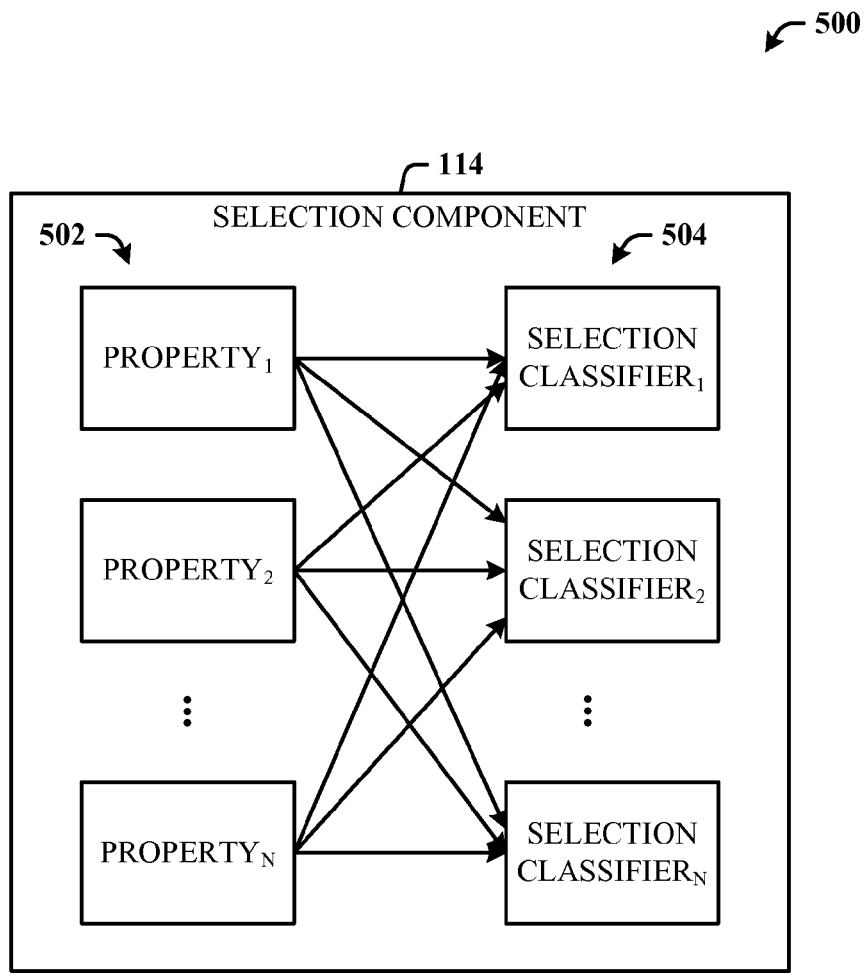
FIG. 5 illustrates an alternative runtime system where properties feed in parallel into a set of classifiers in the selection component.

FIG. 5 illustrates an alternative runtime system 500 where properties 502 feed in parallel into a set of selection classifiers 504 (similar to the selection classifier(s) 116 of FIG. 1) in the selection component 114. In a machine learning and data mining framework, features are properties that can be extracted from each example in the training data—such as byte sequences—that a classifier can use to generate detection models. For realtime systems it is desirable to define such features that do not require an additional file scan.

Features that can be utilized include, but are not limited to features from the header, features based on file properties, features based on the file source, and features based on the number of signatures each malware engine has on each malware type.

Features from the program header can include resource information. In PE (portable executable) files (in the Windows™ operating system), information from the common object file format (COFF) can be extracted and, for example, can use the file size, names of DLLs, and names of function calls within those DLLs and relocation tables.

Different aggregations can be applied to the above (e.g., the number of different function calls used within each DLL). This profile gives a rough measure of how heavily a DLL is used within a specific binary. Intuitively, this is a macro-resource usage model because the number of calls to each resource is counted instead of detailing referenced functions.

The size of each section in the code can be considered as a feature of the program header. Other features of the program header include the signer name, is signer null, signature issuer name, description name, is description null, organization name, is organization null, version, is version null, and file timestamp.

Features based on file properties can include filename, locality sensitive hash of the file, whether the file is packed, and file type (extracted from the binary data by a general navigator).

Features based on file source can include reputation of the server from which the file has been fetched (specifically suitable for web-based systems), and reliability of the sender (e.g., for email messages—check if the sender is in the list of people receiving emails from the recipient).

If performance allows, the file scan (which may be equivalent to running an additional anti-malware engine) can be performed on other features (such as byte sequences (N-grams)) and based on the file content.

Based on these features (or additional features) a set of static rules or a classifier can be constructed to identify which anti-malware engine is considered an expert on the category type of the input file. The classification method can be made in at least two ways. In a first technique, a first stage predicts the category of the unknown file using a file category predictor. This category can be one of clean, virus, trojan, rootkit, file dropper, etc. Then choose the results of the best anti-malware engine or combine the results from the top-N anti-malware engines for the predicted category of the unknown file. In a second technique, all labeled files (e.g., malware, benign) are used to train a classifier which predicts which vendors have the best results.

Following is a description for training machine learning classifiers to be applied for expert selection. Specifically, the algorithm is divided into the classifier's training and the classifier's application on unknown and possibly realtime data.

With respect to anti-malware engine accuracy classification, a classifier can be provided per anti-malware engine (that can be trained offline in a controlled environment). However, this is not to be construed as so limited as training can also be performed on real examples (e.g., online or offline, by batch or one-by-one).

In the training phase of the classifiers, each classifier gets as input a feature vector representing the file to be scanned and a label which indicates if the anti-malware engine classified the file correctly (e.g., to be malware or not). This way, each classifier learns the strengths and weaknesses of the anti-malware engine on which the classifier is being trained. More specifically, let $f_1 \ldots f_n$ be a set of attributes profiling the input file. Let $$L = \begin{cases} 0: & \text{if the classifier had a false positive or false negative on the input} \\ 1: & \text{otherwise} \end{cases}$$

be a parameter that indicates if the anti-malware engine (of index i) identified the file correctly (that is, alerted that it is a malware, if indeed the file was malware or classified the file to be benign, if truly benign).

To determine if an anti-malware engine produces a false positive, the output determinations of all of the set of anti-malware engines are compared. If a single anti-malware engine or more anti-malware engines from independent vendors detects the file as malware, then the file is identified as malware. If a file is determined to be malware, as described above, and a particular anti-malware engine does not detect the file, the anti-malware engine is deemed to produce a false negative for this file and the label L is set to zero. Likewise, if the file is not determined to be malware (e.g., two or fewer detections) and the particular anti-malware engine detects the file as being malware, the label L is also set to zero, since the anti-malware engine produced a false positive. Thus, the feature vector $\{f_1, \ldots, f_n\}$ with the label L is the labeled feature vector for classifier $C_i$ that profiles the malware expertise.

An extended version is to consider separate labels for false positives, false negatives, and otherwise. In this case, let $$L = \begin{cases} 0: & \text{if the classifier had false positive on the input} \\ 1: & \text{if the classifier had false negative on the input} \\ 2: & \text{otherwise} \end{cases}$$

This label definition allows the learning of separate accuracies on the false positives and false negatives.

Alternatively, it is possible to consider only false positive rates for the label. In this case, let $$L = \begin{cases} 0: \text{ if the classifier had false positive on the input} \\ 1: \text{ otherwise} \end{cases}$$

In another case, it is possible to consider only false negatives for the label. In this case, let $$L = \begin{cases} 0: \text{ if the classifier had false negative on the input} \\ 1: \text{ otherwise} \end{cases}$$

The best anti-malware engine can be selected solely on the predicted accuracy or the file determination classification can also be considered, which is described next.

Another way of selecting the list of candidate engines based on the selection classifier is to first train a classifier to predict the "type" of file (e.g., BOT, trojan, etc.). Separately, learn a ranked list of the candidate engines for each "type". At runtime, predict the "type" based on the features (properties) for the file. Then depending on the type, choose the desired ranked list. This technique can be considered a hybrid between the frequency-based list approach and the classifier-based approaches described herein.

Figure 6:
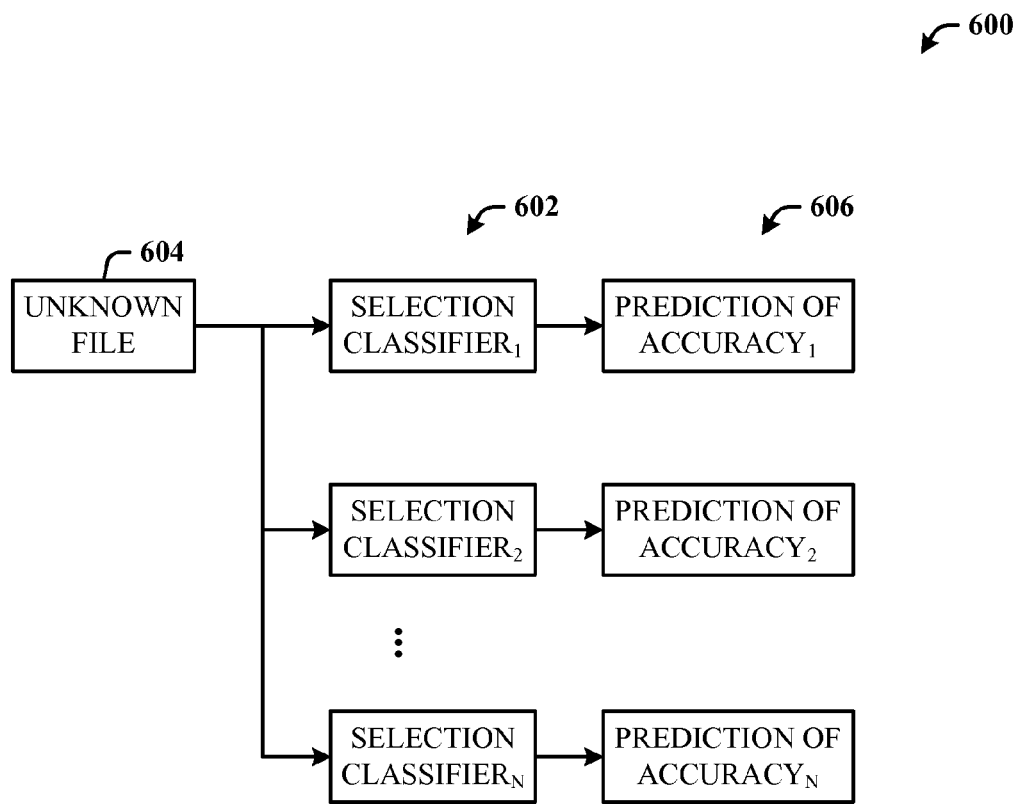
FIG. 6 illustrates a system where at runtime all the classifiers can be applied to a given unknown file.

FIG. 6 illustrates a system 600 where at runtime, all the selection classifiers 602 (similar to selection classifier(s) 116 of FIG. 1) can be applied to a given unknown file 604. This is an alternative way of training a selection classifier. The output of each selection classifier is a prediction of accuracy 606 as to if the anti-malware engine the output represents will be accurate on the data (a class of type L). Therefore, the anti-malware engine with the highest score, as determined by the associated classifier, can be applied for the given file.

The classifier's classification time is very efficient; therefore, the engine can be quickly selected that will most probably classify the file correctly. For this purpose, only classifiers that have fast classification times (e.g., decision trees, naïve Bayes, logistic regression, etc.) will be used.

Stating the above process more precisely, given an input file, extract the feature vector $\{f_1, \ldots, f_n\}$ from the file content. This step, as the defined features are efficiently extracted, is very efficient. Then, apply classifiers i=0 ... N, where N is the number of anti-malware engines. Let $C_j$ be the classifier that returned 1 with the highest probability (if several classifiers, apply any tie-breaking rule). Classifier $C_j$ is more certain than other classifiers that the anti-malware engine it profiles will produce the correct classification on the unknown input file. Some classifiers produce a score instead of a probability estimate. In this case, the anti-malware engines corresponding to the selection classifiers with the highest or best scores will be selected as the candidate engines.

With respect to anti-malware engine file determination classification, the previously described classifier predicts how accurate a given anti-malware engine will be when evaluating an unknown file. It is also desirable to include the ability to predict the probability that an anti-malware engine will classify an unknown file as malicious. If the prediction can be done quickly relative to the time it takes to actually run the unknown file through an anti-malware engine, the features from the unknown file can be evaluated for each anti-malware engine model to predict if one or more would predict that the file is malicious, if scanned.

To do this, a separate classifier is learned for each anti-malware engine that predicts whether the classifier would detect that an unknown file is malware. A classifier per anti-malware engine is utilized that is trained offline (e.g., in a controlled environment). However, this is not to be construed as so limited as training can also be performed on real examples (e.g., online or offline, by batch or one-by-one).

In the training phase of the classifiers, each classifier again gets as input a feature vector representing the file to be scanned and a label which indicates if the file is malware or benign. More precisely, let $f_1 \ldots f_n$ be a set of properties profiling the input file, and let, $$L = \begin{cases} 0: \text{ if the file is not detected as malware by the engine} \\ 1: \text{ if the file is detected as malware by the engine} \end{cases}$$

be a parameter indicating if the anti-malware engine (of index i) detected that the unknown file as malicious. Note that these features can be identical to the features selected for the accuracy classifier.

If a file is not detected as malware by a particular anti-malware engine, the label L is set to zero. Similarly, if the file is detected as malware, the label L is set to one. Thus, the feature vector $\{f_1, \ldots, f_n\}$ with the label L is the labeled feature vector for classifier $C_i$ that profiles the malware likelihood to detect an unknown file as malware.

At runtime, the properties 112 (features) are extracted from the unknown file. This set of features (as a feature vector) is applied to a set of classifiers in the selection component 114, each classifier corresponding to one of the engines 104 in the engine component 102. The output of the ith classifier, $m_i$, is the probability that the file will be detected as malicious, if scanned by the ith engine 104. Therefore, policies can be applied such as to apply only engines that the corresponding classifiers predicted to classify the file as malware. In one example, the classifier may predict an engine will detect the unknown file as malware if $m_i > T$, where T is threshold (e.g., 0.8) determined offline.

With respect to runtime usage of the classifier engines, several additional methods of applying the classifiers and combining the two types of classifiers defined are now described.

The anti-malware engines can be ranked to consider the combination of the malware output probabilities and the output of the accuracy for each engine. Specifically, let $a_i$ represent the predicted accuracy of the ith anti-malware classification engine and $m_i$ be the probability that the ith anti-malware engine will detect the unknown file of a particular file type (t) as malware. The type of the file is determined by the combination of the file's features. Then, a ranked list is created where each element $e_i$ in the list is represented as:

$$e_i = a_i m_i$$

If the ith anti-malware engine is predicted to classify the unknown sample (file) with high probability and high accuracy, then $e_i$ is large. However, if either the output probability or the accuracy probability is low, $e_i$ is ranked lower in the list. Once the ranked list has been constructed, either the anti-malware engine corresponding to the highest ranked element in the list can be selected or the N anti-malware engines corresponding to the top N elements in the list can be selected.

In the case of selecting only the single best classifier, the overall determination of the file is simply the output of the single anti-malware engine. If the engine detects the file as malicious, then the file is deemed malicious; otherwise, the file is determined to be benign. If the unknown file is submitted to multiple anti-malware engines for evaluation, then the outputs can be combined in one of several ways to make the final determination if the unknown final is malware or benign.

In one case, the unknown file is determined to be malware if at least one anti-malware engine classifies the unknown file as malware. However, this can lead to false positives. In another case, the file is determined to be malware if two or more engines detect the file is malware. Selecting two or more engines reduces the chance of false positives, but requires multiple vendors to detect the file is malware. This can lead to a delay in correctly classifying a new file. In a third case, the predicted accuracies to determine if the file is malicious are utilized. The weighted score S for the combined anti-malware engines is:

$$S = \frac{\sum_{l=0}^{L-1} a_l I(\text{file is detected to be malware by engine } l)}{\sum_{l=0}^{L-1} a_l}$$

where $a_l$ is the predicted accuracy of engine l, and l represents the indicator function where it is assigned the value one if the lth anti-malware engine detects that the unknown file is malware. The denominator ensures that the value of S is less than or equal to one. A file is determined to be malware by this method if:

$$S \geq T$$

where T is a threshold determined offline.

In yet another method for combining multiple classifiers, the unknown file is evaluated using the anti-malware engine associated with the element $e_i$ ranked highest in the list. If this anti-malware engine does not detect the file is malicious, the unknown file associated with the next highest ranked element in the list is evaluated, and so on. That is, apply several anti-viruses based on their ranking, as long as the resources permit. In still another technique, a learning method can be employed to learn the best weights in order to combine the outputs of the individual candidate engines 116. Examples of such learning algorithms include ensemble learning or learning a hierarchical classifier.

With respect to user resource specification, some users may be willing to delay processing in order to evaluate the unknown file using many anti-malware engines. First, the user is given the option of specifying the method of selecting which combination of anti-malware engines to choose including the best anti-malware engine or a combination of anti-malware engines. If multiple malware engines are selected, the user is given the option of specifying the maximum number of ranked, anti-malware engines to consider in the evaluation. Alternatively, the user is given the option of specifying the minimum probability of detection of an individual classifier or minimum threshold T for a specific unknown file. In addition, the user can have the option of specifying a maximum processing time to evaluate an unknown file.

In realtime systems, as long as the resources permit, as many engines as possible can be run. When the resources are not sufficient, the meta-classification algorithm for the anti-virus selection can be applied. The meta-classification algorithm chooses the anti-viruses (anti-malware) engines based on the file properties, is trained in an offline backend service, and distributed to all machines that use the meta-classification algorithm. The update can be done periodically, as many anti-virus engines update corresponding capabilities, and thus, can perform better or worse as time passes.

When running multiple anti-malware engines, a generic navigator can first be applied. This navigator performs preliminary parsing of the file, and passes the data to all anti-malware classification engines. Using the data extracted by the navigator and the additional data needed, the disclosed selection architecture can be applied.

Generally, and without limitation, the architecture employs systems and methods by which one or more software engines are selected from a list of specialized software engines to perform the best result for the given input. The selection decision process can be based on a voting mechanism among the candidate software engines. The software engines return some type of classification, such as an anti-malware engine returning whether a file contains malware or not. The input to the software engine includes a program file and/or the source location of the program file. Features (properties) are input to classifiers described herein. For example, linear classifiers typically apply a weight to each feature and then sum the results. The classifier outputs are then used to rank the results.

The matching of program features to a class of programs can be performed via statistical ranking. The program can be a file that was copied from a network or a local drive. The voting can be performed via a majority of the software classification engines, for example. Alternatively or in combination therewith, the voting can be performed by selecting the highest statistical ranking by a central decision module. The file may be of an operating system, web server, application, web browser, independent software module, image, music file, document, etc.

In the specific implementation to malware, one or more candidate anti-malware classification engines are selected from a set of anti-malware classification engines for evaluating an unknown file based on the predicted accuracy of each candidate anti-malware engine in the set of anti-malware engines. The accuracy of each anti-malware engine can be based, in part, on the number of false positives and/or the number of false negatives. The accuracy can be based on predicting the number of errors using a model trained on each anti-malware engine. The one or more anti-malware engines can be further selected based on the prediction of the probability that the anti-malware engine will detect that an unknown file is malware. The results from two or more anti-malware engines can be selected, in part, based on ranking. The results from two or more anti-malware engines are selected, in part, based on voting. The user selects the maximum number of anti-malware engines used to scan the unknown file.

Any language, policy format, or syntax could be used in defining the set of functions, code, executables, applets, etc., that is to be validated and match the identity of the site.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
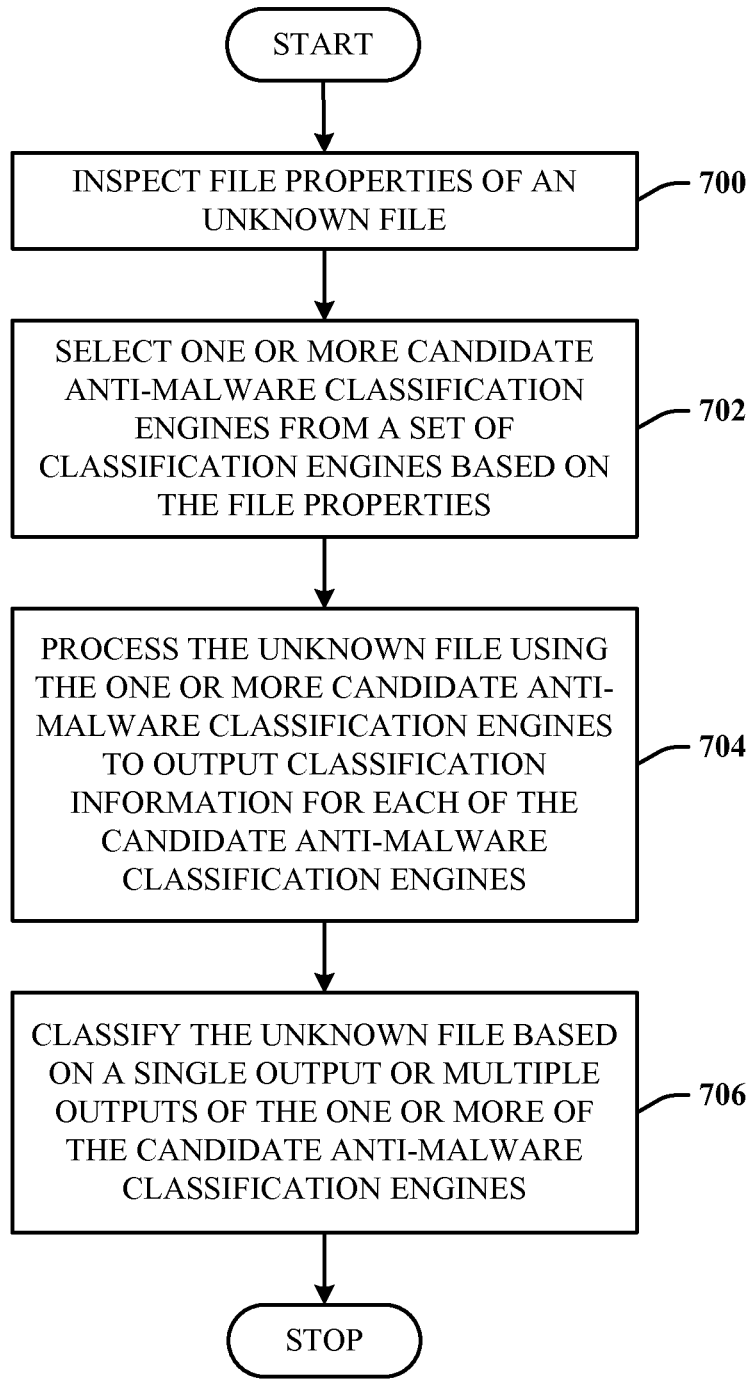
FIG. 7 illustrates a computer-implemented engine selection method in accordance with the disclosed architecture.

FIG. 7 illustrates a computer-implemented engine selection method in accordance with the disclosed architecture. At 700, file properties of an unknown file are inspected. At 702, one or more candidate anti-malware classification engines are selected from a set of classification engines based on the file properties. At 704, the unknown file is processed using the one or more candidate anti-malware classification engines to output classification information for each of the candidate anti-malware classification engines. At 706, the unknown file is classified based on a single output or multiple outputs of the one or more of the candidate anti-malware classification engines.

Figure 8:
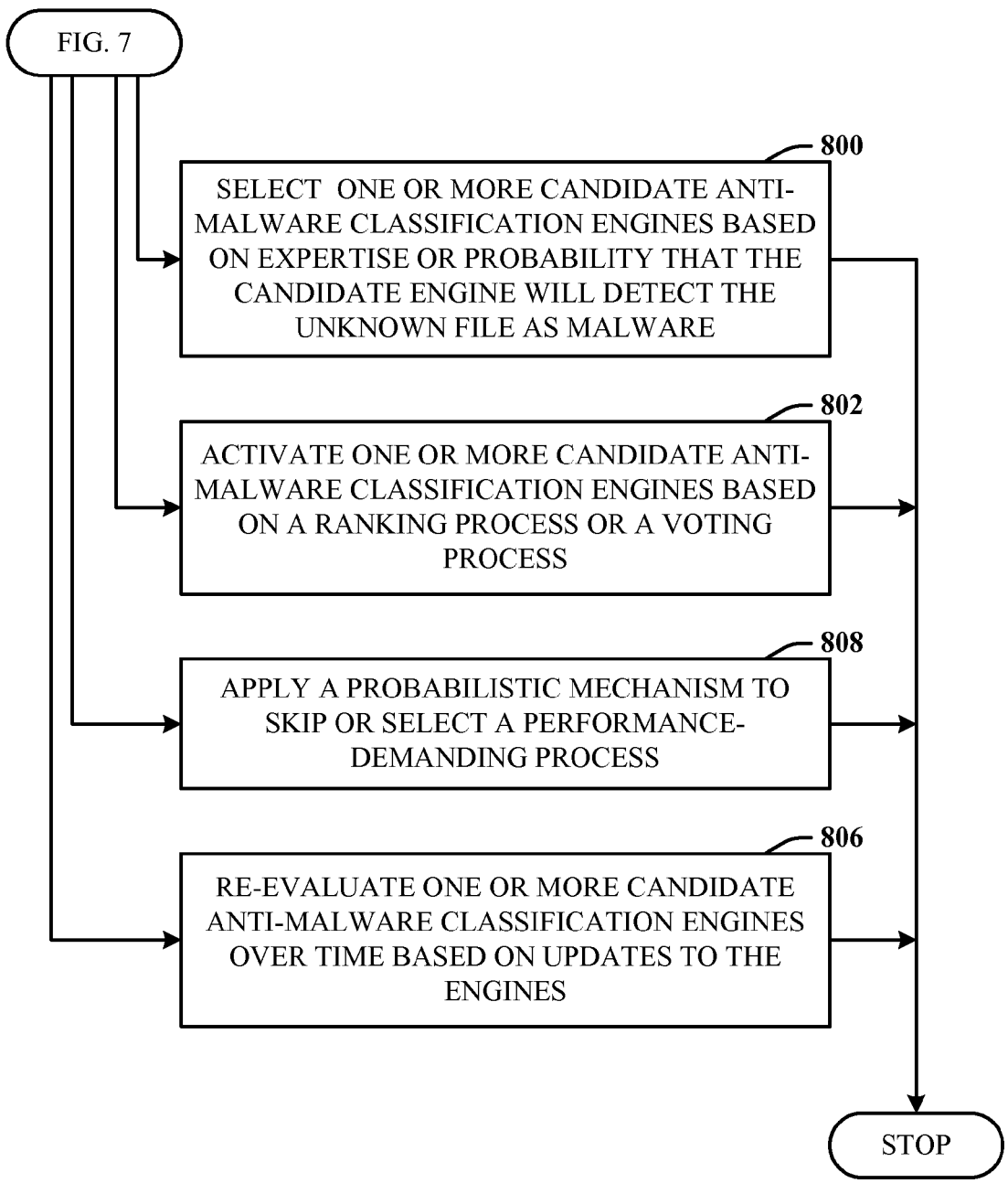
FIG. 8 illustrates further aspects of the method of FIG. 7.

FIG. 8 illustrates further aspects of the method of FIG. 7. Note that the arrowing indicates that each block represents a step that can be included, separately or in combination with other blocks, as additional aspects of the method represented by the flow chart of FIG. 7. At 800, the one or more candidate anti-malware classification engines are selected based on expertise or probability that the candidate engine will detect the unknown file as malware. At 802, the one or more candidate anti-malware classification engines are selected based on a ranking process or a voting process. At 804, a probabilistic mechanism is applied to skip or select a performance-demanding process. At 806/ the one or more candidate anti-malware classification engines are re-evaluated over time based on updates to the engines.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
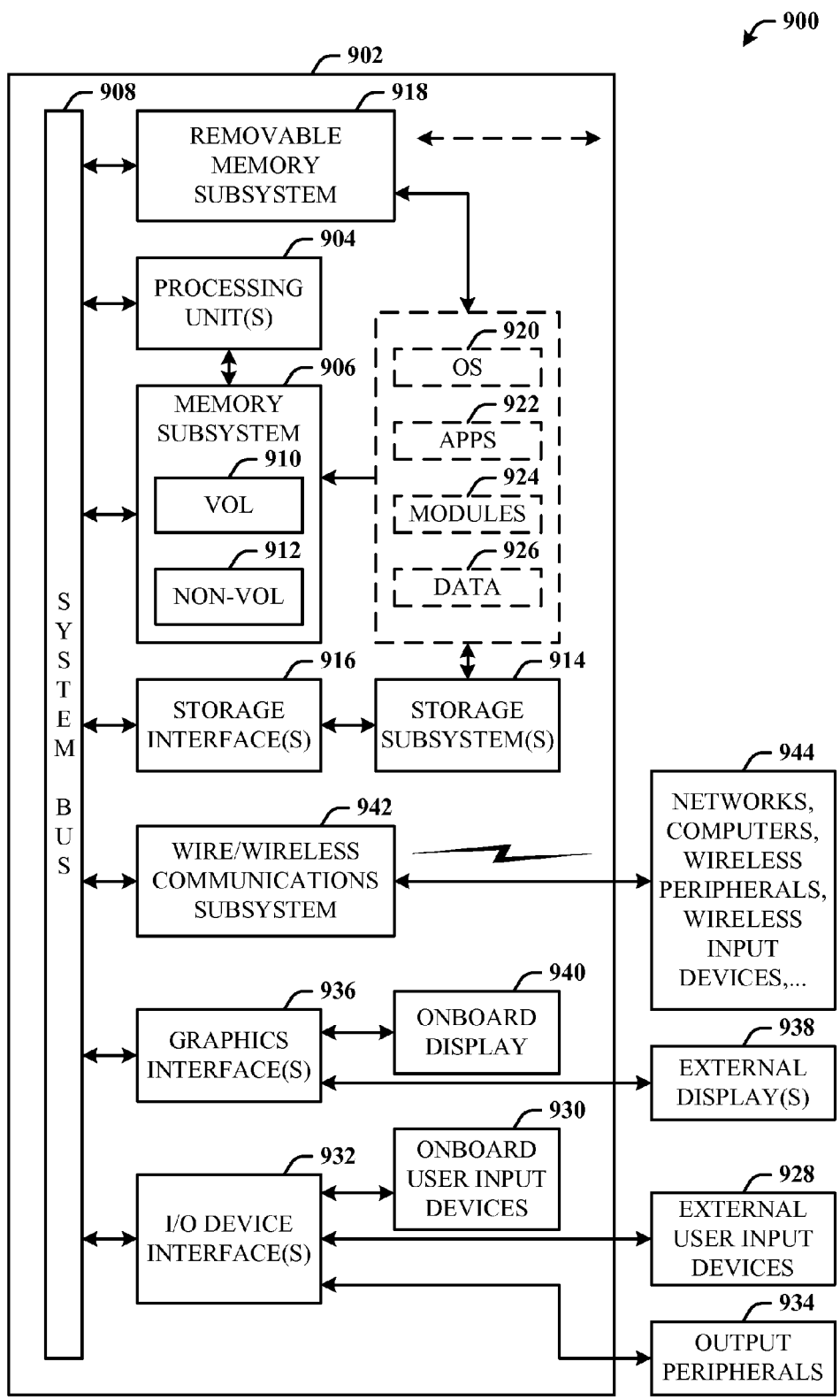
FIG. 9 illustrates a block diagram of a computing system that executes engine selection in accordance with the disclosed architecture.

Referring now to FIG. 9, there is illustrated a block diagram of a computing system 900 that executes engine selection in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the items and components of the system 100 of FIG. 1, the items and components of the system 200 of FIG. 2, the items and components of the system 300 of FIG. 3, the items and components of the system 400 of FIG. 4, the items and components of the system 500 of FIG. 5, the items and components of the system 600 of FIG. 6, and the methods represented by the flowcharts of FIGS. 7 and 8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented engine selection system, comprising:
    an engine component that includes multiple different classification engines that are expensive in terms of at least one of resource usage or processing delay, each of the different classification engines having its own expertise for processing of unknown entities;
    a selection component that employs at least one selection classifier that computes a predicted accuracy for each of the classification engines in handling the unknown entity, the at least one selection classifier configured to enable selection of one or more candidate classification engines of the different classification engines to process the unknown entity, the selection based at least in part on expertise as a probability of a selected candidate classification engine to process entity properties of the unknown entity; and
    a microprocessor that executes computer-executable instructions associated with the engine component, and the selection component.

2. The system of claim 1, wherein the one or more candidate classification engines process the unknown entity and each candidate classification engine outputs classification information that is used to detect the unknown entity.

3. The system of claim 2, wherein the one or more candidate classification engines are selected based on expertise of each candidate engine to identify an entity class.

4. The system of claim 2, wherein the classification information is re-evaluated over time based on updates to the multiple different classification engines.

5. The system of claim 1, wherein at least one of the multiple different classification engines or the one or more candidate classification engines are ranked.

6. The system of claim 1, wherein the candidate classification engines are selected based on a probability that the candidate engines will detect an unknown entity of a specific class.

7. The system of claim 1, wherein the entity includes an unknown file and the classification engines are anti-malware engines that are applied in realtime to determine if the unknown file is malware.

8. The system of claim 1, further comprising a learning component that learns which of the different classification engines is applied to a class of the entities.

9. The system of claim 1, further comprising a configuration component configured to specify a number of ranked candidate engines for each state of a machine and a probability of detection threshold.

10. A computer-implemented engine selection system, comprising:
multiple different anti-malware classification engines that are expensive in terms of at least one of resource usage or processing delay, each anti-malware classification engine having a different expertise for processing of unknown files;
a selection component that employs at least one selection classifier configured to compute a predicted accuracy for each of the classification engines in handling the unknown entity, the selection component is configured to enable a selection of one or more candidate anti-malware classification engines from the different anti-malware classification engines to process the unknown file, the selection based at least in part on file properties of the unknown file and expertise as a probability of a selected candidate classification engine to handle the unknown file;
a learning component that learns the candidate anti-malware classification engines based on successful matching of the candidate anti-malware classification engines to the unknown file; and
a microprocessor that executes computer-executable instructions associated with at least one of the engine component, the inspection component, the selection component, or the learning component.

11. The system of claim 10, wherein the one or more candidate anti-malware classification engines process the unknown file in realtime and each outputs classification information as to a type of the unknown file, the one or more candidate anti-malware classification engines selected based on a likelihood that each candidate engine will correctly identify a type of malware file.

12. The system of claim 10, wherein the one or more candidate anti-malware classification engines process the unknown file in realtime and each associated candidate classification engine outputs classification information as a predicted accuracy as to type of the unknown file, the predicted accuracy of each anti-malware classification engine is based in part on at least one of false positives, false negatives, or errors in a training model used to train a given engine.

13. The system of claim 12, wherein the selection component employs one or more selection classifiers that compute the predicted accuracy of the unknown file for each of the anti-malware classification engines.

14. The system of claim 10, wherein two or more candidate anti-malware classification engines are selected based in part on a voting process or a ranking process and associated outputs are combined to output an overall detection output.

15. The system of claim 10, wherein the input to a candidate anti-malware classification engine includes at least one of a program file or a source location of the program file.

16. A computer-implemented engine selection method performed by a computer system executing machine-readable instructions, the method, comprising acts of:
inspecting file properties of an unknown file;
providing multiple different expensive classification engines, that are expensive in terms of at least one of resource usage or processing delay, each of the engines having different expertise for processing of the file properties;
employing at least one selection classifier that computes a predicted accuracy for each of the classification engines in handling the unknown file, the selection classifier configured to select one or more candidate classification engines from a set of classification engines each having a different expertise associated with processing the file properties, the selection based in part on expertise as a probability of a selected candidate classification engine will detect the unknown file;
processing the unknown file using the one or more candidate classification engines to output classification information for each of the candidate classification engines;
classifying the unknown file based on a single output or multiple outputs of the one or more of the candidate classification engines; and
configuring at least one microprocessor to perform the acts of inspecting, providing, employing, processing, and classifying.

17. The method of claim 16, further comprising selecting the one or more candidate classification engines, which are anti-malware classification engines, based on expertise indicating a probability that the candidate engine will detect the unknown file as malware.

18. The method of claim 16, further comprising activating the one or more candidate classification engines based on a ranking process or a voting process.

19. The method of claim 16, further comprising applying a probabilistic mechanism to skip or select a performance-demanding process as relates to usage of a classification engine.

20. The method of claim 16, further comprising re-evaluating the one or more candidate classification engines over time based on updates to the engines.

* * * * *